United States Patent
Sinclair

(10) Patent No.: US 7,310,699 B2
(45) Date of Patent: Dec. 18, 2007

(54) MASS STORAGE ACCELERATOR

(75) Inventor: Alan Welsh Sinclair, Maddiston (GB)

(73) Assignee: SanDisk Corporation, Milpitas, CA (US)

( * ) Notice: Subject to any disclaimer, the term of this patent is extended or adjusted under 35 U.S.C. 154(b) by 0 days.

(21) Appl. No.: 11/541,013

(22) Filed: Sep. 29, 2006

(65) Prior Publication Data

US 2007/0028040 A1    Feb. 1, 2007

Related U.S. Application Data

(63) Continuation of application No. 10/772,789, filed on Feb. 4, 2004, now Pat. No. 7,127,549.

(51) Int. Cl.
*G06F 12/00* (2006.01)
(52) U.S. Cl. .................. 711/100; 711/103; 711/111; 711/154; 711/221
(58) Field of Classification Search ................ 711/100, 711/103, 111, 154, 221
See application file for complete search history.

(56) References Cited

U.S. PATENT DOCUMENTS

| | | | |
|---|---|---|---|
| 4,896,262 A | 1/1990 | Wayama et al. |
| 5,542,066 A | 7/1996 | Mattson et al. |
| 5,544,356 A | 8/1996 | Robinson et al. |
| 5,586,291 A | 12/1996 | Lasker et al. |
| 5,636,355 A | 6/1997 | Ramakrishnan et al. |
| 5,708,846 A | 1/1998 | Ryan |
| 5,754,888 A | 5/1998 | Yang et al. |
| 5,778,418 A | 7/1998 | Auclair et al. |
| 5,798,968 A | 8/1998 | Lee et al. |
| 5,890,192 A | 3/1999 | Lee et al. |
| 6,016,530 A | 1/2000 | Auclair et al. |
| 6,286,056 B1 | 9/2001 | Edgar et al. |
| 6,370,614 B1 | 4/2002 | Teoman et al. |
| 6,408,357 B1 | 6/2002 | Hanmann et al. |
| 6,424,486 B2 | 7/2002 | Heaton et al. |
| 6,631,456 B2 | 10/2003 | Leighnor et al. |

(Continued)

FOREIGN PATENT DOCUMENTS

EP    0702305 A1    2/1996

(Continued)

OTHER PUBLICATIONS

PCT Search Report and Written Opinion from International Application No. PCT/US2005/000275.

(Continued)

*Primary Examiner*—Stephen C. Elmore
(74) *Attorney, Agent, or Firm*—Beyer Weaver LLP

(57) ABSTRACT

A data storage device is provided. A disk device is combined with a non-volatile memory device to provide much shorter write access time and much higher data write speed than can be achieved with a disk device alone. Interleaving bursts of sector writes between the two storage devices can effectively eliminate the effect of the seek time of the disk device. Following a non-contiguous logical address transition from a host system, the storage controller can perform a look-ahead seek operation on the disk device, while writing current data to the non-volatile memory device. Such a system can exploit the inherently faster write access characteristics of a non-volatile memory device, eliminating the dead time normally caused by the disk seek time.

15 Claims, 10 Drawing Sheets

U.S. PATENT DOCUMENTS

| | | |
|---|---|---|
| 6,646,948 B1 | 11/2003 | Stence et al. |
| 6,728,851 B1 | 4/2004 | Estakhri et al. |
| 6,898,662 B2 | 5/2005 | Gorobets |
| 7,024,614 B1 * | 4/2006 | Thelin et al. ............... 714/770 |
| 2001/0052038 A1 | 12/2001 | Fallon et al. |
| 2002/0069354 A1 | 6/2002 | Fallon et al. |
| 2002/0083280 A1 | 6/2002 | Naitoh et al. |
| 2005/0125600 A1 | 6/2005 | Enrlich |
| 2005/0125602 A1 | 6/2005 | Ehrlich |
| 2005/0125603 A1 | 6/2005 | Ehrlich |

FOREIGN PATENT DOCUMENTS

| | | |
|---|---|---|
| WO | 9750035 A1 | 12/1997 |
| WO | 02058074 A2 | 7/2002 |

OTHER PUBLICATIONS

Office Action of Mar. 24, 2006 from Application No. 10/772,789.
Office Action dated Feb. 26, 2007 from corresponding European Patent Application No. 05711276.5.

* cited by examiner

MASS STORAGE ACCELERATOR

CROSS-REFERENCE TO RELATED APPLICATIONS

This application is a continuation of U.S. patent application Ser. No. 10/772,789, filed Feb. 4, 2004, and entitled "DISK ACCELERATION USING FIRST AND SECOND STORAGE DEVICES" that has issued as U.S. Pat. No. 7,127,549 which is hereby incorporated herein by reference in its entirety and for all purposes.

This application is also related to the U.S. patent application Ser. No. 10/772,855, filed Feb. 4, 2004, and entitled "Dual Media Storage Devices," that has issued as U.S. Pat. No. 7,136,973 which is hereby incorporated herein by reference in its entirety and for all purposes.

BACKGROUND OF THE INVENTION

1. Field of the Invention

The present invention relates generally to data storage devices, and more specifically to dual media storage.

2. Description of the Related Art

General-purpose computers require a mass storage system. Unlike main memory, which is used for the direct manipulation of data, mass storage is used to retain data. Generally a program is stored in mass storage and, when the program is executed, either the entire program or portions of the program are copied into main memory. The speed at which a system is able to locate and transfer the program and its associated data from the mass storage device into the main memory is integral to the overall speed of a system.

Common mass storage devices include floppy disks, hard disks, optical discs and tapes. Each device has both strengths and weaknesses, which can relate to capacity, price, speed and portability.

Additionally, other devices, such as flash memory, can provide non-volatile storage. Flash memory is a type of electrically erasable programmable read-only memory (EEPROM). Although flash memory is typically not as fast as the volatile main memory, it is faster than hard disks.

The inventor has previously explored the concept of merging separate devices into a single mass storage system in order to maximize each device's strengths and minimize each device's weaknesses. For example, the inventor was also identified as the inventor for PCT application "Memory Device" WO 97/50035 that was published on Dec. 31, 1997, incorporated herein by reference for all purposes. That PCT application described a memory system that included both a relatively slow-access mass data storage device, such as a hard disk, and a relatively fast-access data storage device, such as flash memory. A similar concept has been explored in the U.S. patent, "Mass Computer Storage System Having Both Solid State and Rotating Disk Types of Memory," U.S. Pat. No. 6,016,530, issued to Daniel Auclair and Eliyahou Harari on Jan. 18, 2000, incorporated herein by reference in its entirety for all purposes.

By combining a non-volatile flash memory device with a non-volatile hard disk, a resulting mass storage system can be greater than the sum of its parts. However, such memory system was specifically limited to a situation where only one version of each data sector was ever maintained. The data sector was stored in either the high-speed memory or in the slow-access mass data storage device, making the logical address space equal to the sum of the capacities of the high-speed memory and the slow-access mass storage device.

There are many commercially successful non-volatile memory products being used today that employ an array of flash cells formed on one or more integrated circuits chips. A memory controller, usually (but not necessarily) on a separate integrated circuit chip, controls operation of the memory array. Such a controller typically includes a microprocessor, some non-volatile read-only memory (ROM), a volatile random-access memory (RAM) and one or more special circuits such as one that calculates an error-correction-code (ECC) from data as it passes through the controller during programming and reading operations.

Memory cells of a typical flash array are divided into discrete blocks of cells that are erased together. That is, the erase block is the erase unit—a minimum number of cells that are simultaneously erasable. Each erase block typically stores one or more pages of data, the page programmed or read in parallel in different sub-arrays or planes. Each planes typically stores one or more sectors of data, the size of the sector being defined by the host system. An example sector includes 512 bytes of user data, following a standard established with magnetic disk drives. Such memories are typically configured with 16, 32 or more pages within each erase block, and each page stores one or just a few host sectors of data.

In order to increase the degree of parallelism the array is typically divided into sub-arrays, commonly referred to as planes. Each plane can contain its own data registers and other circuits to allow parallel operation such that the sectors of data may be programmed to or read from all the planes simultaneously. An array on a single integrated circuit may be physically divided into planes, or each plane may be formed from a separate one or more integrated circuit chips. Examples of such a memory implementation are described in U.S. Pat. No. 5,798,968, "Plane decode/virtual sector architecture," issued to Lee et al. on Aug. 25, 1998, and U.S. Pat. No. 5,890,192, "Concurrent write of multiple chunks of data into multiple subarrays of flash EEPROM," issued to Lee et al. on Mar. 30, 1999, both of which incorporated herein by reference in their entireties for all purposes.

To further efficiently manage the memory, erase blocks may be linked together to form virtual blocks or metablocks. That is, each metablock is defined to include one erase block from each plane. Use of the metablock is described in international patent application "Partial Block Data Programming And Reading Operations In A Non-Volatile Memory," publication no.: WO02/058074 on Jul. 25, 2002, incorporated herein by reference in its entirety for all purposes. The metablock is identified by a host logical block address as a destination for programming and reading data. Similarly, all erase blocks of a metablock are erased together. The controller in a memory system operated by such large blocks and/or metablocks performs a number of functions including the translation between logical block addresses (LBAs) received from a host, and physical block numbers (PBNs) within the memory cell array. Individual pages within the blocks are typically identified by offsets within the block address.

Flash memory systems of this type are commonly used as mass storage devices in portable applications. The flash memory device communicates with a host system via a logical interface using a protocol such as ATA, and is frequently in the form of a removable card. Some of the commercially available cards are CompactFlash™ (CF) cards, MultiMedia cards (MMC), Secure Digital (SD) cards, Smart Media cards, personnel tags (P-Tag) and Memory Stick cards. Hosts include personal computers, notebook computers, personal digital assistants (PDAs), various data communication systems, and similar types of equipment. Besides the memory card implementation, this type of memory can alternatively be embedded into various types of host systems.

There are continuing efforts to improve mass storage devices.

SUMMARY OF THE INVENTION

The present invention provides a data storage system that generally includes a first storage device, a second storage device and a storage controller. The second storage device has a slower average access time and a higher capacity than the first storage device. Average access time is the average delay that is necessary before the device can begin to read or write data.

In one embodiment, the storage controller is operable to direct a first portion of data to the first storage device and a second portion of data to the second storage device. In another embodiment, the storage controller is operable to retrieve a first portion of data from the first storage device and a second portion of data from the second storage device.

Typically, the first portion of data is the first portion of data in a contiguous data stream. Similarly, the second portion of data is the remaining data from the data stream. A table is usually used to contain information relating to the location of the first portion of data and the location of the second portion of data.

In another embodiment, the data is stored by first receiving a write command from a host system bus to write to a data address. The first portion of the data is then stored in the first storage device. Prior to the first portion of the data being completely stored in the first device, the second storage device is prepared to write data. After the second storage device is ready, the remaining portion of the data is stored in the second storage device.

In yet another embodiment, a read command is first received from the host system bus. The data storage system then determines if a first portion of the data resides on the first storage device. If the data does resides on the first storage device, then: the first portion of the data is read from the first storage device; the second storage device is prepared to read the remaining portion of data prior to the completion of reading the first portion of the data; and the remaining portion of data from the second storage device is read. Otherwise, if the first portion of data does not reside on the first storage device, then both the first portion of the data and the remaining portion of the data are read from the second storage device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention may best be understood by reference to the following description taken in conjunction with the accompanying drawings, in which.

It is to be understood that, in the drawings, like reference numerals designate like structural elements. Also, it is understood that the depictions in the figures are not necessarily to scale.

DETAILED DESCRIPTION OF THE PREFERRED EMBODIMENTS

In the following description, numerous specific details are set forth to provide a thorough understanding of the present invention. However, it will be apparent to one skilled in the art that the present invention may be practiced without some or all of these specific details. In other instances, well known process steps have not been described in detail in order to avoid unnecessarily obscuring the present invention.

The present invention generally improves upon prior mass storage devices, also commonly called auxiliary memory, by combining two separate storage devices, each having its own strengths and weaknesses. For example, although flash has a faster access time than a hard drive, it generally does not have the storage capacity of a hard drive. As will be appreciate by those skilled in the art, any two non-volatile storage devices can be used in the present invention as long as one has a faster access time than the other. Access time, as applied to storage devices, is generally defined as the time between when a storage device receives a data request and when the storage device actually begins to read and/or write the data. For example, with data on either a hard or floppy disk, access time is generally equal to the sum of command overhead time, seek time, settle time, and latency.

Seek time and latency dominate the overall access time for a disk. Seek time of a disk is the time taken for a read/write head to move from one track to another. For a hard disk, this is typically 1 mSec for a seek to an adjacent track, 15 mSec for a full-stroke seek (a seek from the inner to outer track, or vice versa) and 10 mSec on average for random seeks. Latency is the time for an addressed sector on the platter to rotate to the head, once the head is positioned on an addresses track, and is a function of the rotational speed of the disk. For a rotational speed of 7200 rpm, latency is 4.14 mSec average, and 8.3 mSec maximum.

In contrast, on a typical flash disk device, a sector of data may be transferred to the device in approximately 30 µS, and eight sectors may be programmed in parallel in the flash memory in 200 µS. This provides a burst write speed of about 16 MB/s, in which eight sectors may be written to the device every 250 µS. However, the device also has to perform occasional housekeeping operations such as garbage collection, relocation of data sectors to complete a block of data, and block erasure. Therefore, the effective time to program eight sectors can occasionally be considerably longer. The sustained write rate of a flash may, therefore, be about 15 MB/Sec. Of course, other sector transfer and parallel programming schemes may be employed in a flash disk device, giving a different operating speed.

Figure 1A:
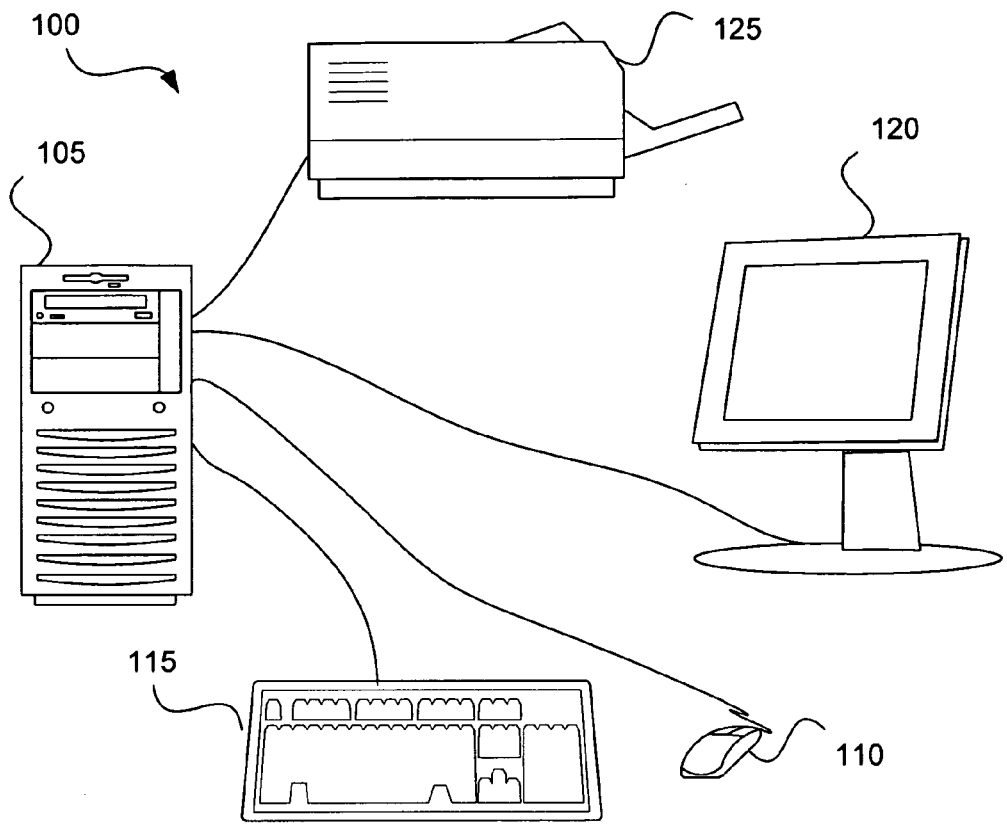
FIG. 1A depicts an exemplary general-purpose computer system that can utilize the invention.

FIG. 1A depicts an exemplary general-purpose computer system 100 that can utilize the current invention. Components include a computer 105, various input devices such as a mouse 110 and keyboard 115, and various output devices such as a monitor 120 and a printer 125.

Figure 1B:
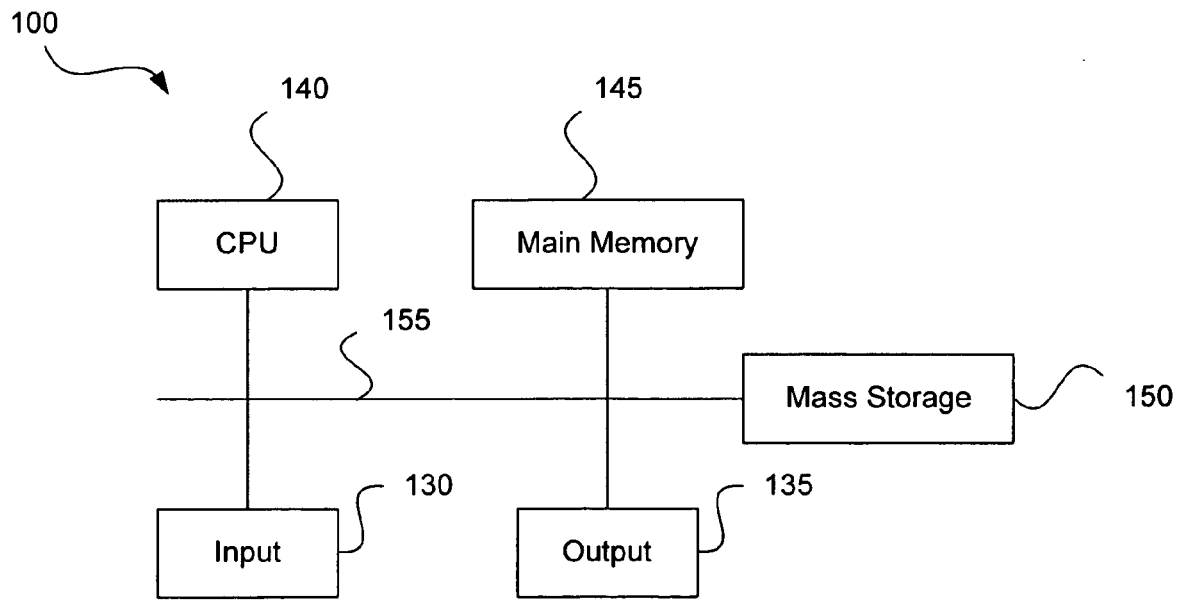
FIG. 1B depicts an abstracted representation of the general-purpose computer system of FIG. 1A.

FIG. 1B depicts an abstracted representation of a computer system 100 of FIG. 1A that depicts its essential components. A single component 130 represents input devices that allow a user to interact with the computer system 100, such as a mouse and keyboard. Similarly, a single component 135 represents the output devices that display what the computer system 100 has accomplished, such as a monitor and printer. The heart of the computer system 100 is a central processing unit (CPU) 140, and is the component that executes instructions. Main memory 145 is typically volatile and provides the CPU 140 with both the instructions to be executed and data to be manipulated by the instructions. These components 130, 135, 140, and 145 are all well known in the art.

An improved mass storage device 150 allows the computer system 100 to permanently retain large amounts of data. The components 130, 135, 140, 145, and 150 are able to exchange information with each other via a host bus 155.

Figure 2A:
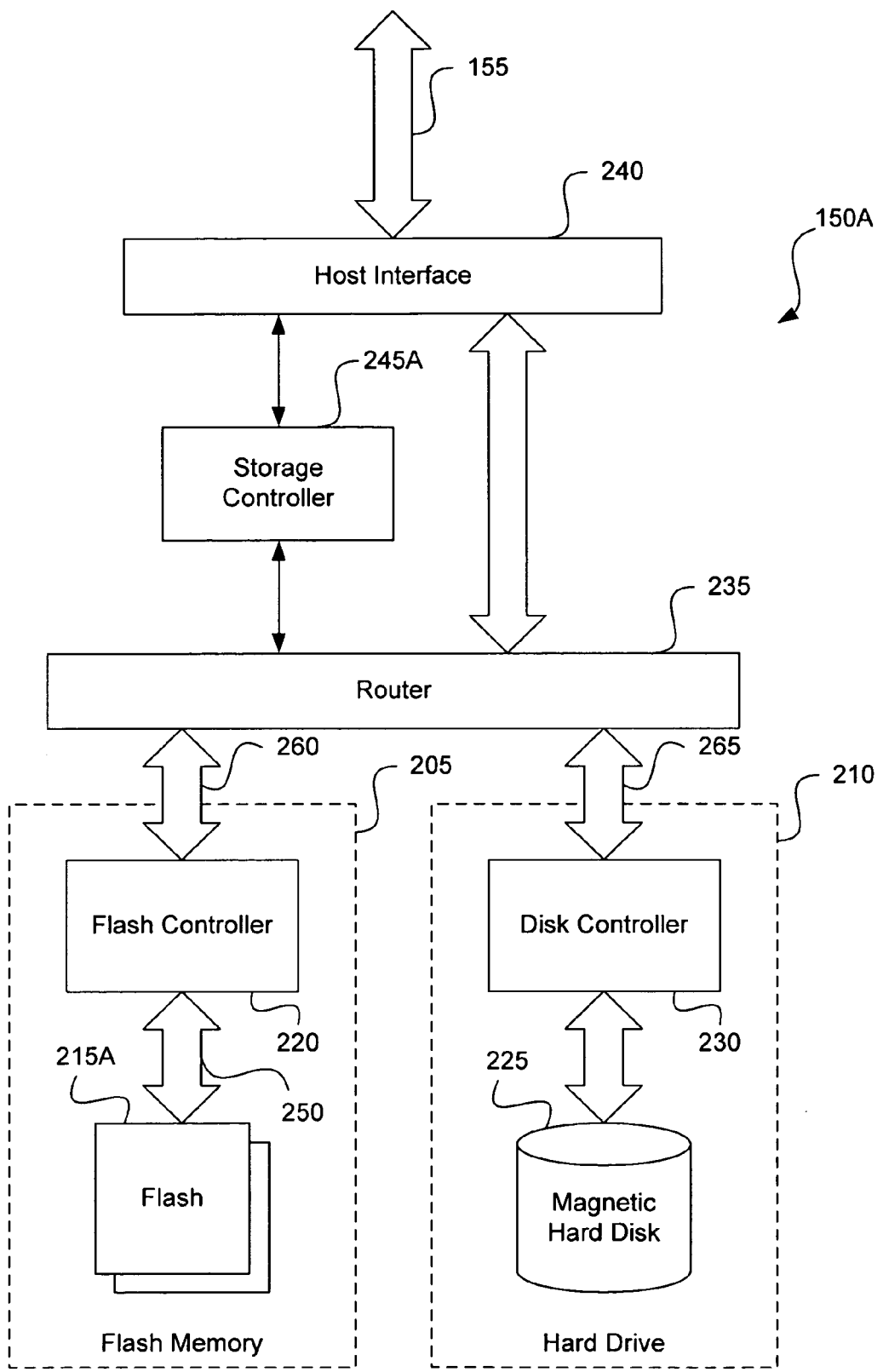
FIG. 2A depicts the improved mass storage device according to an exemplary embodiment of the present invention.

FIG. 2A depicts an improved mass storage device 150A according to one embodiment of the present invention. Two storage devices, a flash memory system 205 and a hard drive 210, are connected in parallel. The flash memory system 205 includes a flash memory array 215 and a flash controller 220. The hard drive 210 includes a magnetic hard disk 225 and a disk controller 230. Each controller 220 and 230 is in charge of the operations specific to the respective memory type. For example, the flash controller 220 controls all logical-to-physical mapping of data sectors and all flash memory management such that the interface 250 between the flash controller 220 and the flash memory array 215 is a physical interface. The disk controller 230 manages operation of the magnetic hard disk 225 for reading and writing. Both controllers 220 and 230 connect to a router 235 via logical interfaces 260 and 265.

A host interface 240 and a storage controller 245 are both positioned upstream from the router 235, which allows data and control information to be passed in either direction between the host interface 240 and either the disk controller 230 or the flash controller 220. Additionally, the router 235 can control transfer of data in either direction between the disk controller 230 and the flash controller 220. Such transfers can be done as a stand-alone operation. Alternatively, such transfers can be done in conjunction with a data transfer in either direction between the host interface 240 and one of the mass storage controllers 220 or 230. The router 235 can incorporate control logic for such data transfers.

The host interface 240 provides a direct interface to the host bus 155, and can provide all support for the specific protocol in use on the host bus 155. The subsystem formed by the host interface 240, the disk controller 230 and the magnetic hard disk 225 as well as the subsystem formed by the host interface 240, the flash controller 220 and the flash memory array 215 each form complete data storage systems. The router 235 may pass data and control signals without modification from the host interface 240, or may establish an alternative protocol for communication with the controllers 220 and 230. The interfaces 260 and 265 between the router 235 and the mass storage controllers 220 or 230 may be a standard protocol, such as ATA, or may be a special interface defined for the improved mass storage device 150. The interfaces 260 and 265 are typically logical interfaces providing random read and write access to individual sectors of data in the flash memory system 205 and the hard drive 210 and are not dependent on the physical characteristics of the respective storage media.

In addition, the flash controller 220 might also support special commands or operations on the interface 260 to give direct access to reserved areas of the flash memory array 215, which can be used for storage of tables and information logs used by the storage controller 245A. Alternatively, the storage controller 245A might have its own non-volatile memory for such tables and logs.

The storage controller 245A is an intelligent control unit that directs the transfer of information between the host interface 240 and the mass storage controllers 220 and 230. The storage controller 245A coordinates the storage of data to or reading of data from the flash memory system 205 or the hard drive 210. The storage controller 245A can maintain address tables for information stored in the flash memory array 215.

Volatile memory might act as a buffer or cache memory in many of the components of the improved mass storage device 150, including the host interface 240, the router 235, the flash controller 220 or the disk controller 230. Either a single volatile memory may be scheduled to operate in the various components, or separate volatile memories can be dedicated to each component.

In another embodiment, the functions of the controllers 220 and 230 can be merged together with the router 235, in an integrated controller device. This device may also include the storage controller 245 and the host interface 240. However, such a configuration would require the production of new controller units. Accordingly, either one or both of the controllers 220 and 230 would simply not be included in the memory devices. While such a configuration would require new control circuitry to be developed, it may also reduce the number of total components that are required.

Figure 2B:
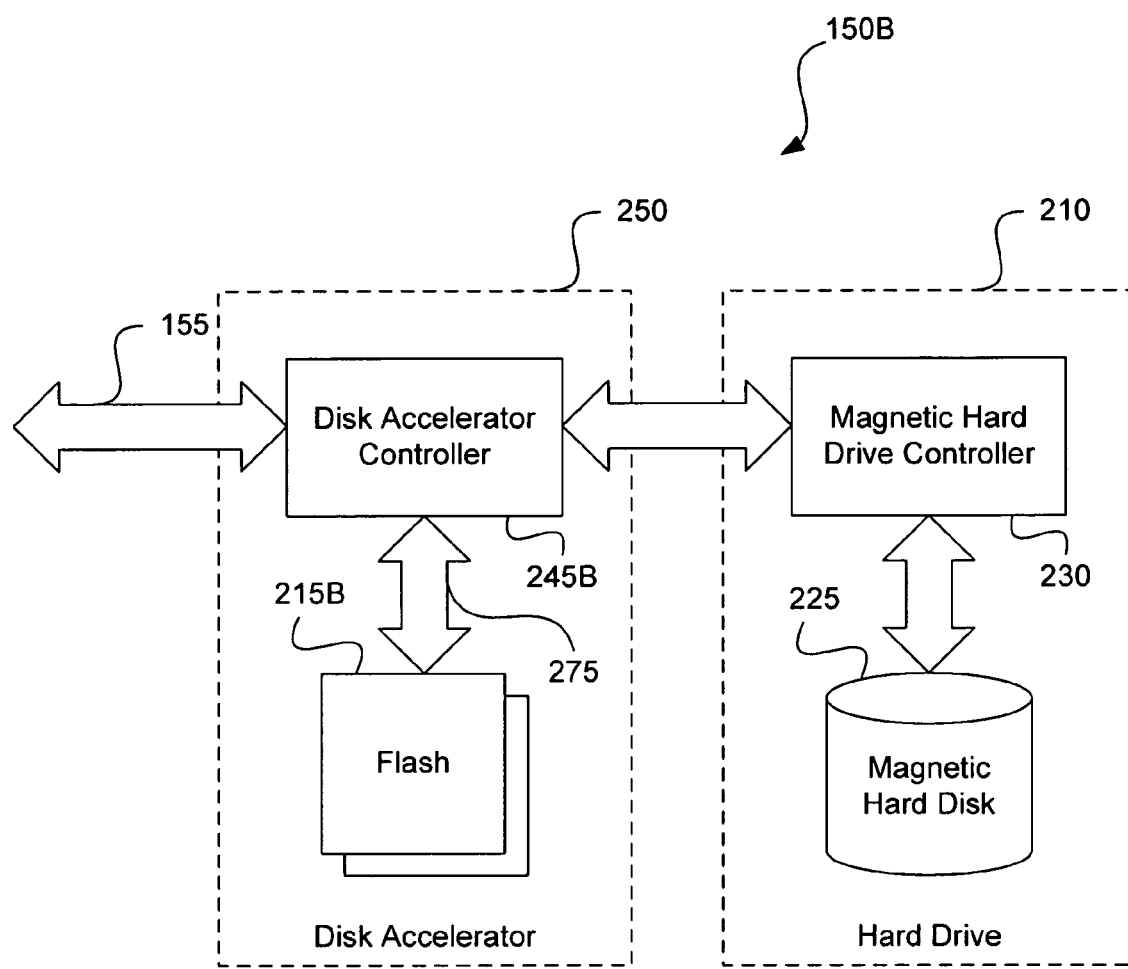
FIG. 2B depicts the improved mass storage device according to another exemplary embodiment of the present invention.

FIG. 2B depicts an improved mass storage device 150B according to another embodiment of the present invention. The improved mass storage device 150B keeps the same hard drive 210 components as in the improved mass storage device 150A of FIG. 2A, but that uses a storage controller 245B that includes the functions of the router 235 and the host interface 240 as well as the main functions of the storage controller 245A of FIG. 2A. The logical interface 260 is eliminated and is replaced by a physical interface 275 directly connected to a flash memory array 215B. In such a configuration a disk accelerator 250 would preferably be a front-end cache on the ATA interface to the hard drive 210 or integrated into the hard drive 210 assembly in order to utilize pre-existing components of the hard drive 210. In this embodiment, the function of the flash controller 220 is not required and the flash memory array 215B does not form part of a logical data storage device, but is used directly as a physical store. It is particularly suited to temporary storage of streams of data.

Regardless of the specific architecture used, disk acceleration can generally be achieved by writing and/or reading a "head" data to or from a first storage device while a second storage device is experiencing latency. In the embodiments shown in FIG. 2A and FIG. 2B, the flash memory array 215 experiences significantly less latency than the magnetic hard disk 225. Instead of waiting for the read/write head of the magnetic hard disk 225 to be properly positioned, an initial portion of the data stream ("head data") is written to the flash memory array 215 of the flash memory system 205. Once the magnetic hard disk 225 is ready to accept data, the remaining portion ("body data") is written to the magnetic hard disk 225 of the hard drive 210. Together, the head data and the body data make a single data fragment. A data fragment could be defined as a burst of data that would cause the second storage device to experience a non-trivial access time. In the case of a magnetic hard disk 225, a data fragment could be described as sequential data that is non-contiguous with preceding data, thereby forcing the hard drive 210 to experience seek time and/or latency.

Depending upon how the improved mass storage device 150 is utilized, the size of the head data can either be calculated on an as-needed basis or can simply be a standard size. A standard size can be based on a number of factors, including an average seek time of the hard drive 210, size of the flash memory array 215, and/or the numbers of logically contiguous sectors that can be written before a significantly extended effective programming time will occur as a result of a garbage collection operation.

Figure 3A:
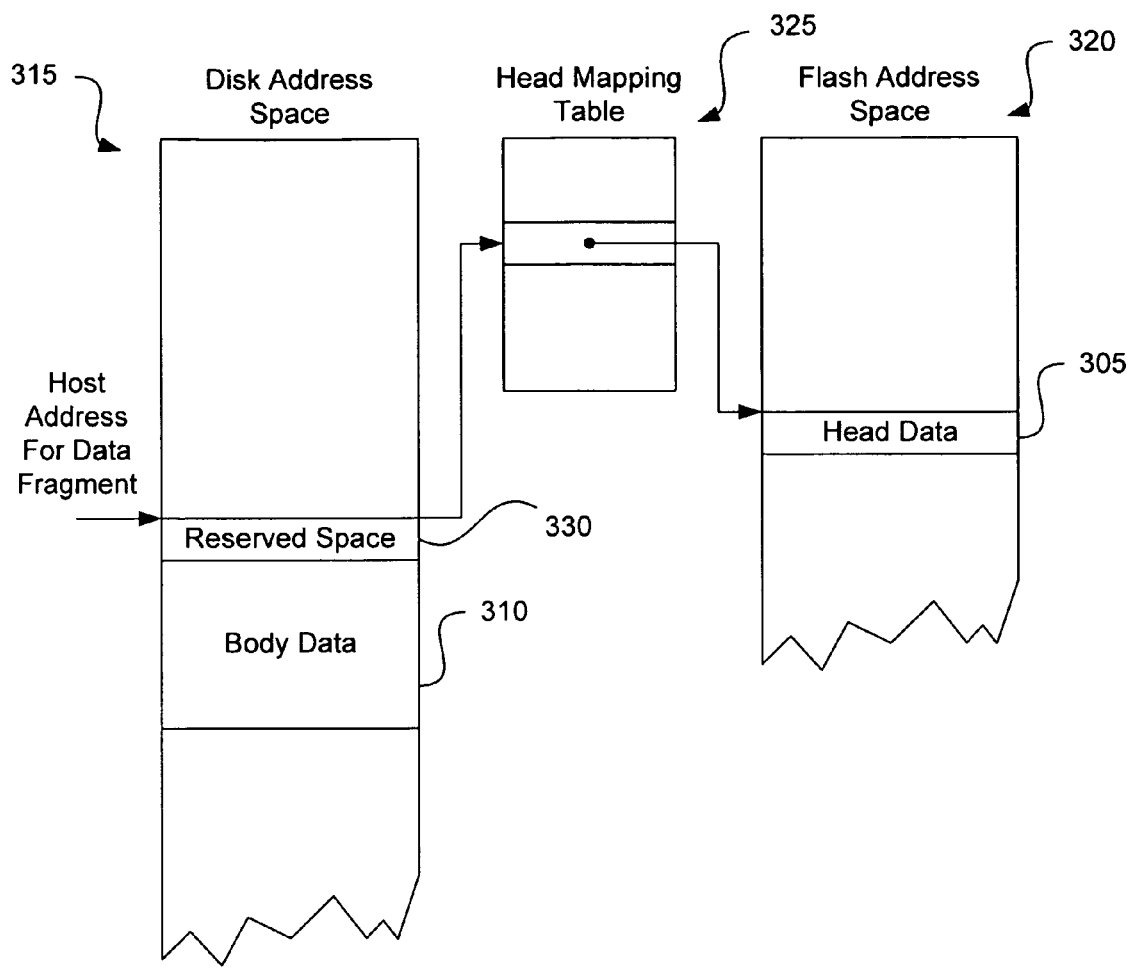
FIG. 3A depicts an abstracted representation of head data and body data in a hard drive address space and a flash address space.

FIG. 3A depicts an abstracted representation of head data 305 and body data 310 in the hard drive address space 315 and the flash address space 320. A head mapping table 325 is used by the storage controller 245A or 245B to coordinate the storage of the head data 305 and body data 310. If the flash address space 320 was large enough, then the head data 305 could permanently reside in the flash memory array 215. However, if the flash space was limited, then mechanisms would need to be implemented that allow the head data 305 to be removed from the flash memory array 215 in order to make room for new head data.

One such mechanism could include reserving space 330 in the disk address space for the head data 305. As space is needed in the flash memory array 215, the head data 305 can be copied to the reserved space 330, making the entire data fragment contiguous on the magnetic hard disk 225. Preferably, the copying of the head data 305 can be done as a background operation when the improved mass storage device 150A or 150B is not in use. The frequency of such sector relocation is preferably dependent on the ratio of memory capacities in the disk device and flash memory device, and on the number of separate contiguous sector sequences that are written to the improved mass storage device 150.

Figure 3B:
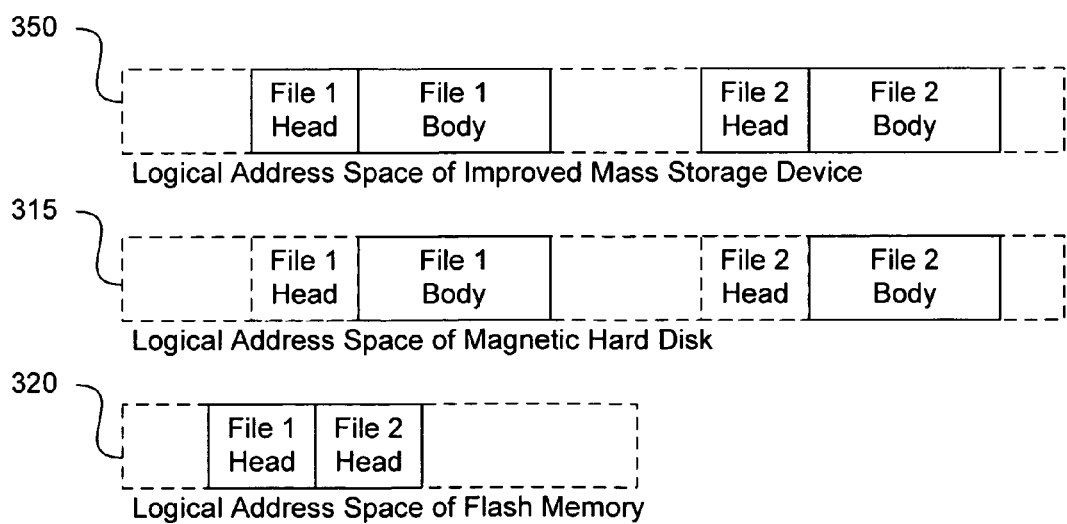
FIG. 3B depicts an abstracted representation of a hard drive address space and a flash address space in relation to the address space for the entire improved mass storage device.

Similarly, FIG. 3B depicts an abstracted representation of the disk address space 315 and the flash address space 320 in relation to an address space 350 for the entire improved mass storage device. Since space is reserved in the disk address space 315 for the head data, the address space 350 for the improved mass storage device is equal to the disk address space 315.

Figure 4A:
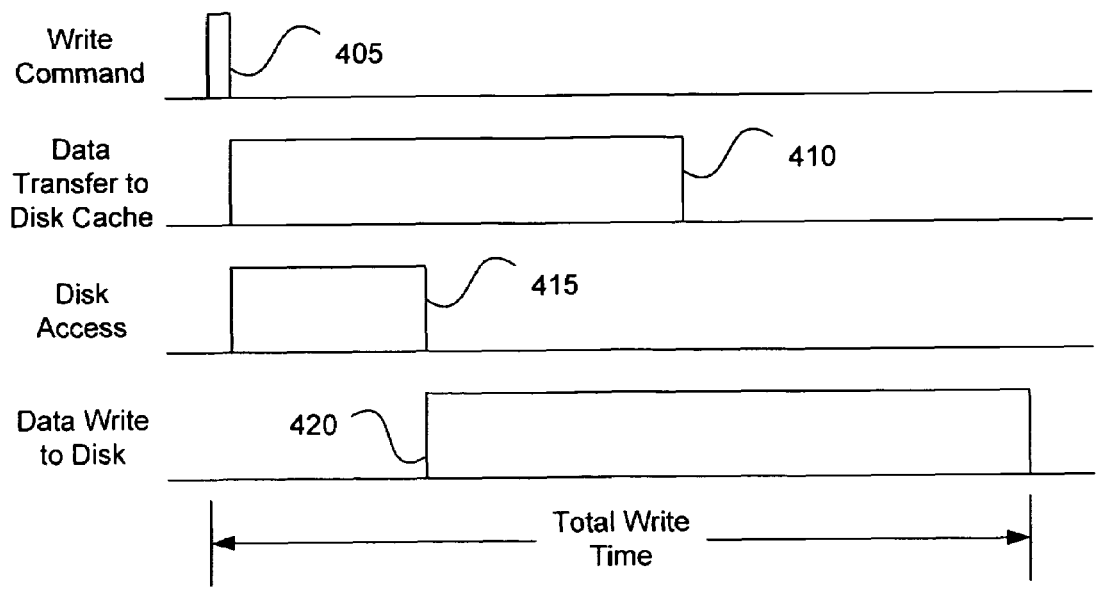
FIG. 4A is a timing diagram that depicts conventional write processing that occurs when a write command is received by a system that does not use disk acceleration.
Figure 4B:
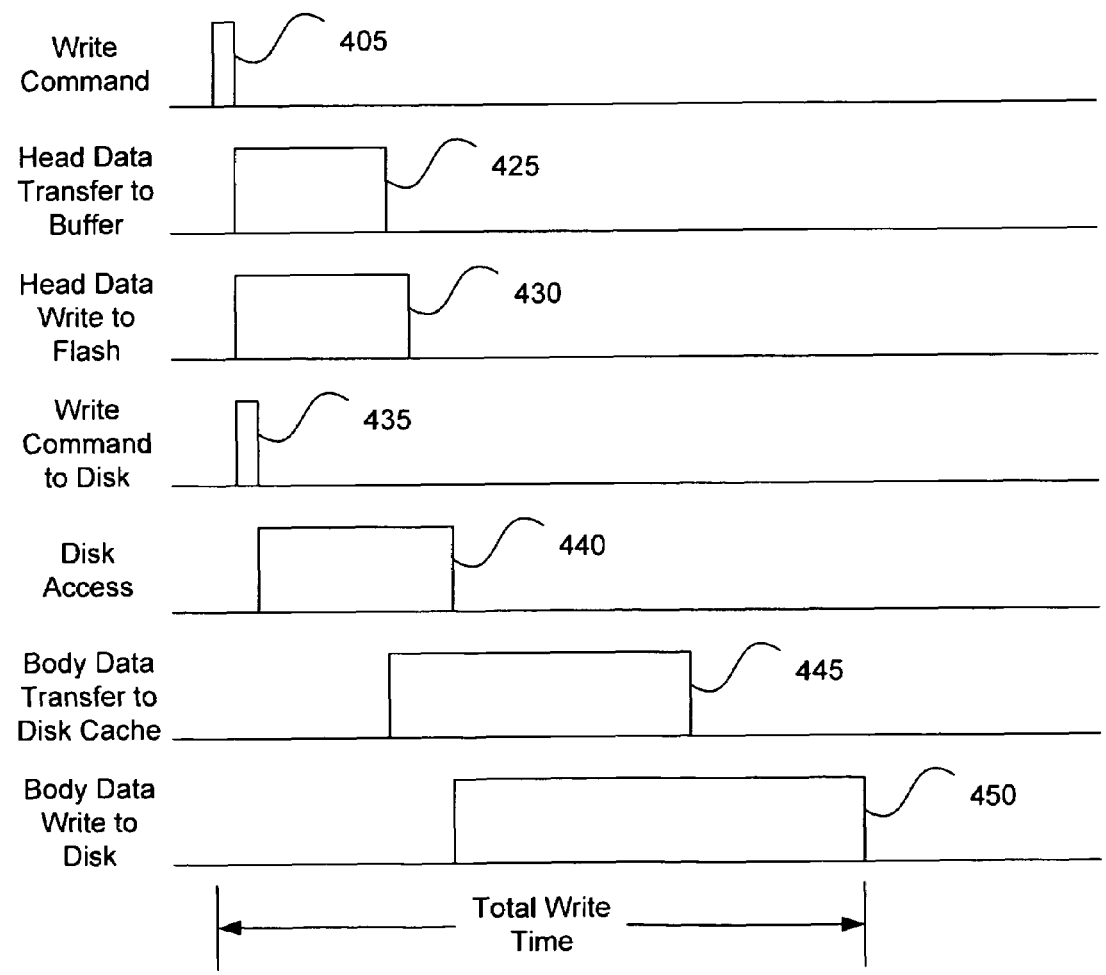
FIG. 4B is a timing diagram that depicts write processing that occurs when a write command is received by a system that uses disk acceleration according to an exemplary embodiment of the present invention.

The increase in system performance from using the improved mass storage device can be seen in the differences between FIG. 4A and FIG. 4B. FIG. 4A is a timing diagram that depicts conventional write processing that occurs when a write command 405 is received by a mass storage system. Here, the mass storage system does not use disk acceleration provided by the present invention. Typically, data 410 begins to be transferred to a disk cache at about the same time the read/write head for the hard drive 210 begins to move 415 into position. Once both the read/write head and the magnetic hard disk 225 are in position, data 420 can begin to be written to the magnetic hard disk 225. Typically, the time it takes to write the data 420 from the cache to the magnetic hard disk 225 is longer than the time it takes to transfer the incoming data 410 into the cache.

FIG. 4B is a timing diagram that depicts write processing that occurs when a write command 405 is received by a mass storage system that uses disk acceleration according to an embodiment of the present invention. Several different operations can begin as a result of the write command 405 being received. For example, the transfer of head data 425 and 430 into the flash memory can be initiated. Volatile buffer memory does not require housekeeping operations like flash. Therefore, storing the head data 430 into the flash memory system 205 typically includes transferring the head data 425 to a buffer and then transferring the head data 425 from the buffer to the flash memory system 205 to yield the head data 430 in the flash memory system 205. While the head data 425 and 430 is being stored, the hard drive 210 prepares for receiving data. If space is being reserved for the head data, then a new write command 435 is presented to the hard drive 210. The new write command 435 would not direct the read/write head to the address of the data fragment, but to the address of the body data, which is simply the fragment address offset by the space allocated for the head data. After the new write command 435 is received by the hard drive 210, the read/write head and the hard disk are positioned 440 appropriately.

Once the head data 425 is fully transferred to the flash buffer 425, then the body data 445 begins to be stored in the disk cache of the improved mass storage device. Therefore, the speed at which a host system can transfer data into the improved mass storage device 150 is the same as with a system that does not use disk acceleration. When the read/write head and the hard disk are in position, body data 450 can begin to be written to the magnetic hard disk as soon as the body data is available. The total time it takes to write the data fragment in FIG. 4B is significantly less than the total time required in FIG. 4A.

Figure 5A:
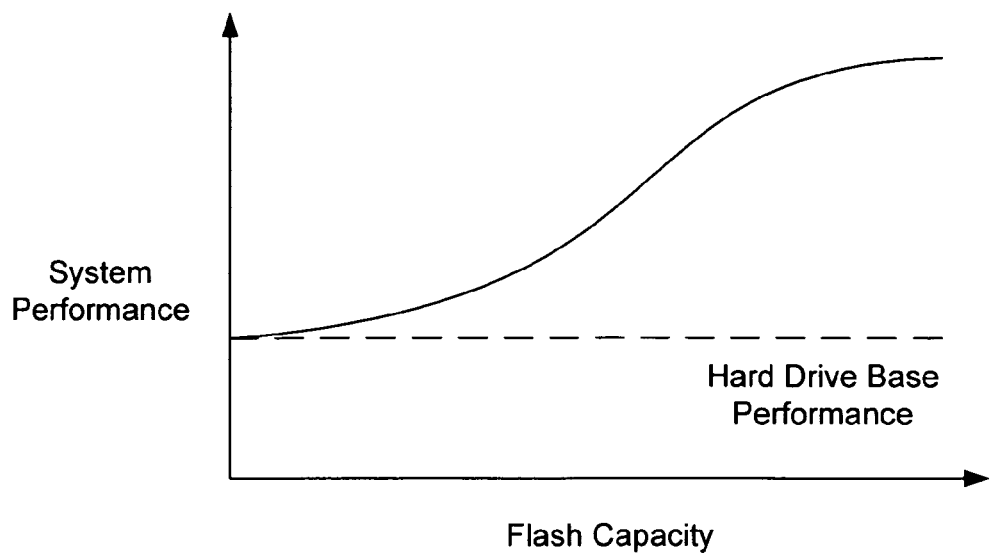
FIG. 5A depicts a graph illustrating system performance benefits as flash capacity increases.

However, the overall increase in system performance depends upon both the capacity of the flash memory array 215 and how often the improved mass storage device 150 is being accessed. As the capacity of the flash memory array 215 increases, the system performance benefits get more drastic, as shown in FIG. 5A. The bigger the flash memory array 215, the more data can be stored during bursts of activity having multiple data fragments.

Figure 5B:
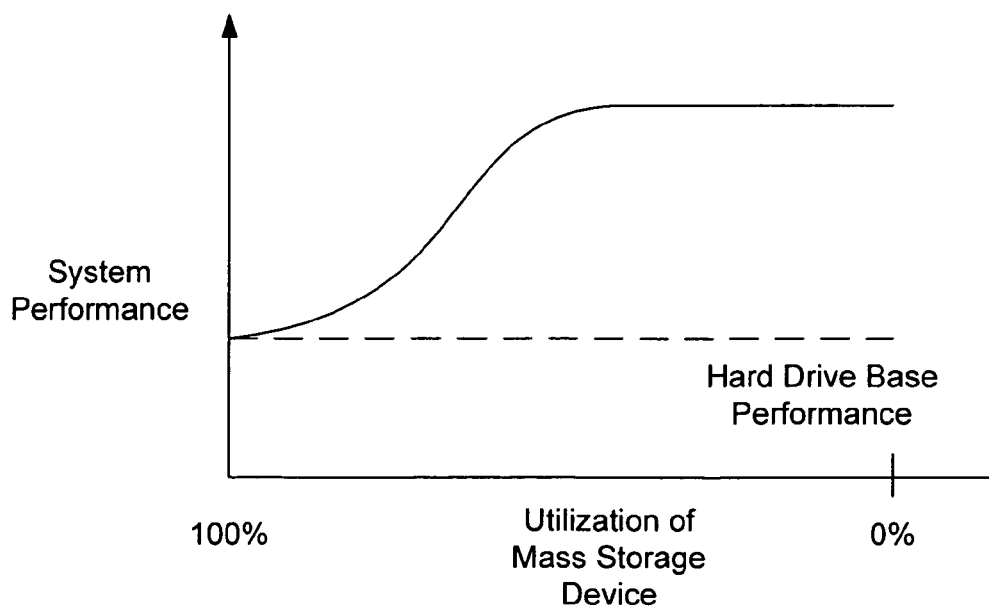
FIG. 5B depicts a graph illustrating system performance benefits as utilization of the improved mass storage device decreases.

Similarly, FIG. 5B shows that as the improved mass storage device 150 becomes more utilized, the system performance degrades. If the mass storage device 150 is constantly accessed, there will not be enough time to transfer the head data from the flash memory array 215 to the magnetic hard disk 225 (assuming transfers are necessary). Eventually, the mass storage device 150 must, depending upon its error-handling routine, either transfer old head data before accepting new head data or stop using the flash memory array 215 and exclusively use the hard drive 210 for new data fragments. If the latter error handling routine were used, the system performance would be identical to a system that only used a hard drive 210, as shown in FIG. 5B. Such an error handling routine could also be utilized if the flash memory array 215 is temporarily not available (e.g., the flash memory array 215 is engaged in a garbage collection process). Collisions with garbage collection would be reduced if garbage collection operations were performed while host data was being written to the hard drive 210, which would typically be a time of inactivity for the flash memory array 215.

Figure 6:
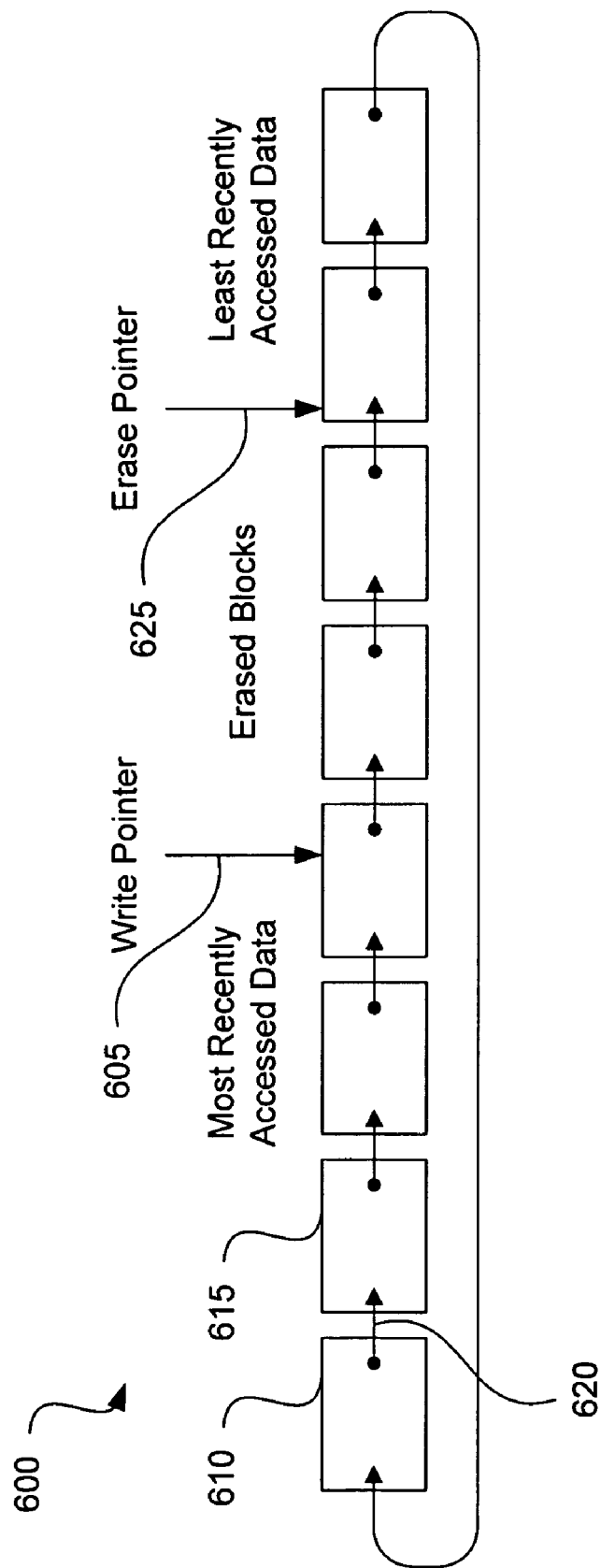
FIG. 6 depicts a stylized representation of a ring buffer.

FIG. 6 depicts one way of organizing storage of sectors in a stream of data in flash memory array 215B, in the form of a ring buffer 600. The current location for writing a sector of data is defined by a write pointer 605, which moves clockwise in FIG. 6 through the address space in an endless cycle. The address space is defined by metablocks (e.g. 610 and 615), which are linked (e.g. 620) either in a pre-set order or in an order dynamically determined when the write pointer 605 moves from a full metablock to a new erased metablock. An erase pointer 625 similarly moves clockwise in FIG. 6 through the address space in an endless cycle. The metablocks identified by the erase pointer 625 are erased at a rate that ensures a small pool of erased metablocks is maintained ahead of the write pointer 605, for storage of new data sectors. The blocks being erased contain the least recently written data in the ring buffer 600.

Head data is stored in a cyclic address space, that is, an address space in which incremental address transitions can be made continuously by providing an incremental step from the highest address back to the lowest. In the embodiment of the improved mass storage device 150A depicted in FIG. 2A, the cyclic address space is provided by a cyclic buffer within a portion of the logical address space of the flash memory system 205. In the embodiment of the improved mass storage device 150B depicted in FIG. 2B, the cyclic address space is provided by the ring buffer 600 within the physical address space of flash memory array 215B.

The capacity of the flash memory array 215 is normally less than the capacity which would be required to store all head data relating to the entire address space 350 for the improved mass storage device 150, in order to keep the cost of the flash memory as low as possible. There is, therefore, a requirement to copy head data from the flash memory array 215 to the appropriate reserved space on the magnetic hard disk 225, in order to free up space in the flash memory array 215 for continued storage of head data. The means by which this is performed can have an important effect on the overall increase in the system performance achieved by the improved mass storage device 150.

Figure 9:
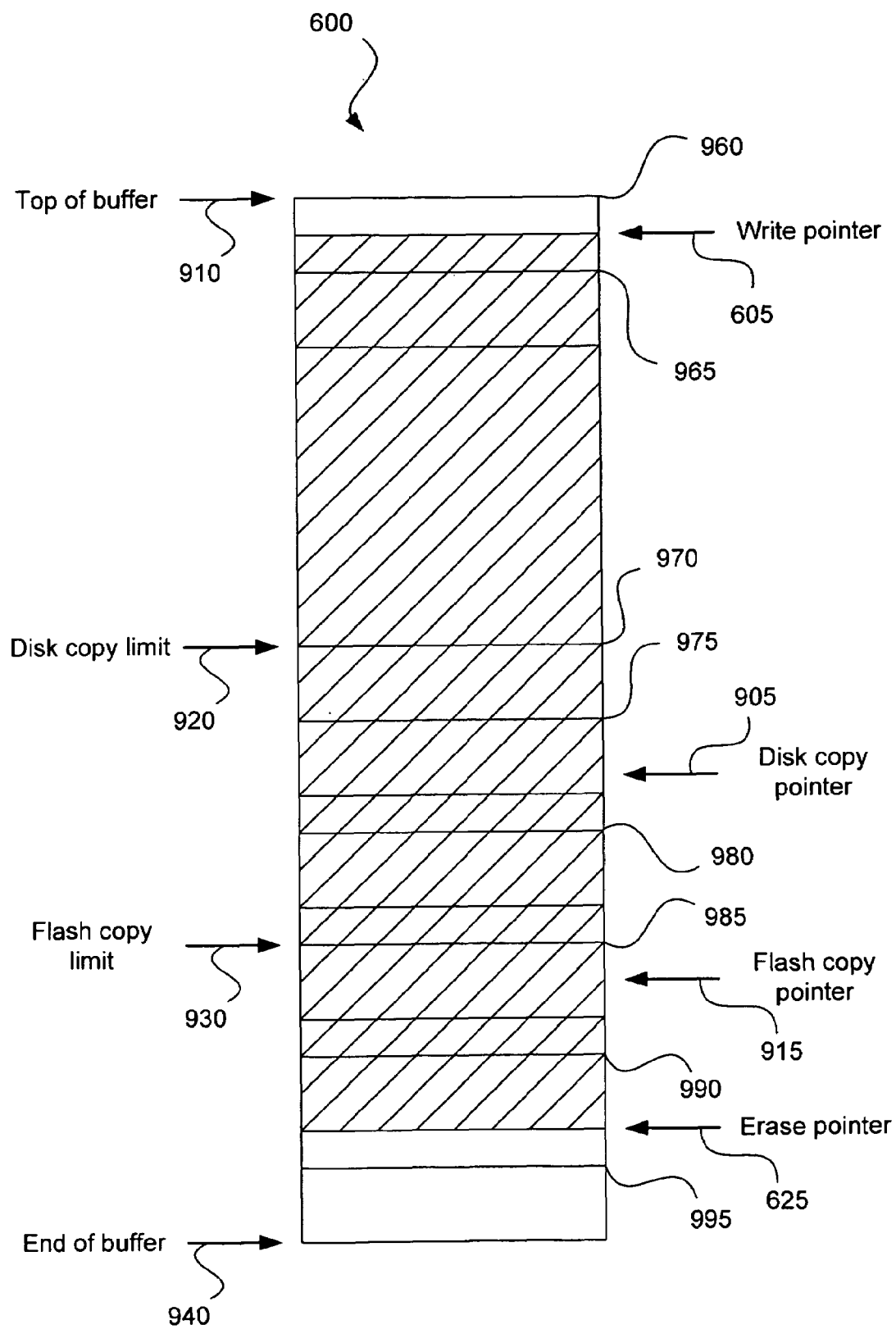
FIG. 9 is a representation of a map of sector storage locations within the ring buffer of FIG. 6.

FIG. 9 depicts a map of sector storage locations within the ring buffer 600, relating to a method of managing the copying of head data to the hard drive 210. The ring buffer 600 has a cyclic address space, with wrap-around from its last physical address to its first physical address. The ring buffer 600 includes metablocks 960, 965, 970, 975, 980, 985, 990, and 995. Sector data is written to the buffer at the location defined by the incrementing write pointer 605. FIG. 9 depicts this cyclic address space as a moving linear address space, with the metablock 960 that contains the write pointer 605 being assigned as the top of the buffer 910. The metablock 995 immediately before the write pointer 605 in the cyclic buffer 600 is assigned as the end of the buffer 940. The erase pointer 625 defines the next target block for erasure, and also the end of the head data entries in the buffer. The metablocks between the erase pointer 625 and the end of buffer 940 are in the erased state.

Valid head data is copied from the metablock 990 identified by the erase pointer 625, to allow erasure of the metablock 990. The head data 305 is copied to the corresponding reserved space 330 on the magnetic hard disk 225 if it has not been read since it was written to the ring buffer 600. However, the head data 305 can also be copied back to flash memory at the write pointer 605 if it has been read since being written, and therefore be retained in the ring buffer 600. This allows the head data that is likely to be read by the host system to still remain available in the ring buffer 600. Valid head data can be identified using head mapping table 325, and logical address information in a header of the data sectors themselves. If valid head data overlaps the boundary between the metablock 990 and another metablock, the entire head data is copied intact.

Head data, however, may be invalid because more recent head data for the same logical address exists elsewhere in the ring buffer 600. In this case, the head data need not be copied before erasure of the metablock 990.

Copy-ahead operations may be performed on metablocks other than those identified by the erase pointer 625. This allows, for example, copy operations to the flash memory array 115 to continue while copy operations to the hard disk 225 are temporarily prevented by a disk accesses required by the host. A flash copy pointer 915 and a disk copy pointer 905 are used to identify the location of the next required copy operation. Valid head data located between the erase pointer 625 and the copy pointers 905 and 915 should have already had all their required copy operations performed. Since it is desirable to store as much valid head data as possible in the ring buffer 600, limits are set on the extent of such copy-ahead operations that are performed. A disk copy limit 920 and a flash copy limit 930 define the maximum extents the disk copy pointer 905 and the flash copy pointer 915 may move ahead of the erase pointer 625.

The metablock erasure need not be restricted to the metablock identified by the erase pointer 625. For example, if the metablock 990 at the erase pointer 625 requires further flash copy operations, while the metablock 980 between the erase pointer 625 and the disk copy pointer 905 already contains no un-copied valid data, the metablock 980 may be immediately erased. In this case, a block link table defining the order in which metablocks are linked to form the ring buffer may be modified, to move the newly erased metablock 980 below the erase pointer 625.

The copying of head data is performed as a background task, wherever possible. A copy to the flash memory array 215 may be performed concurrently with host-to-disk or disk-to-host data transfers. Alternatively, if a complete metablock should be copied, no actual data need be moved. The block link table may be simply modified to relocate the data within the buffer. A fast disk copy may be performed between ring buffer 600 and the hard disk cache when the host interface is inactive. A disk copy may be safely aborted if host activity starts, and may be resumed or repeated at a later time.

Management tables stored in flash memory array 215 can include a head mapping table 325 and a block linking table. In one embodiment, the head mapping table 325 has only one entry for each valid head data fragment stored in the flash memory array 215. The entries are then stored in discontinuous logical address order in a set of head mapping table sectors in a dedicated block, to permit searching for an entry with a defined logical address. Each entry can have separate fields for a logical address within the improved mass storage device, a physical address within the ring buffer, a size of the head data (if a fixed head size is not used), a read flag indicating that the head data has been read since it was written, and a copy flag indicating that the head data has been copied to hard drive 210. The block linking table has one entry for each linked metablock in ring buffer 600. The entries are stored in block linking order in a set of link table sectors in a dedicated block. New link table sectors may be added, and their order modified. Each sector need not be full, and new entries may be added. The last written link table sector can contain information defining the location of all valid link table sectors in the dedicated block, and their order.

Figure 7:
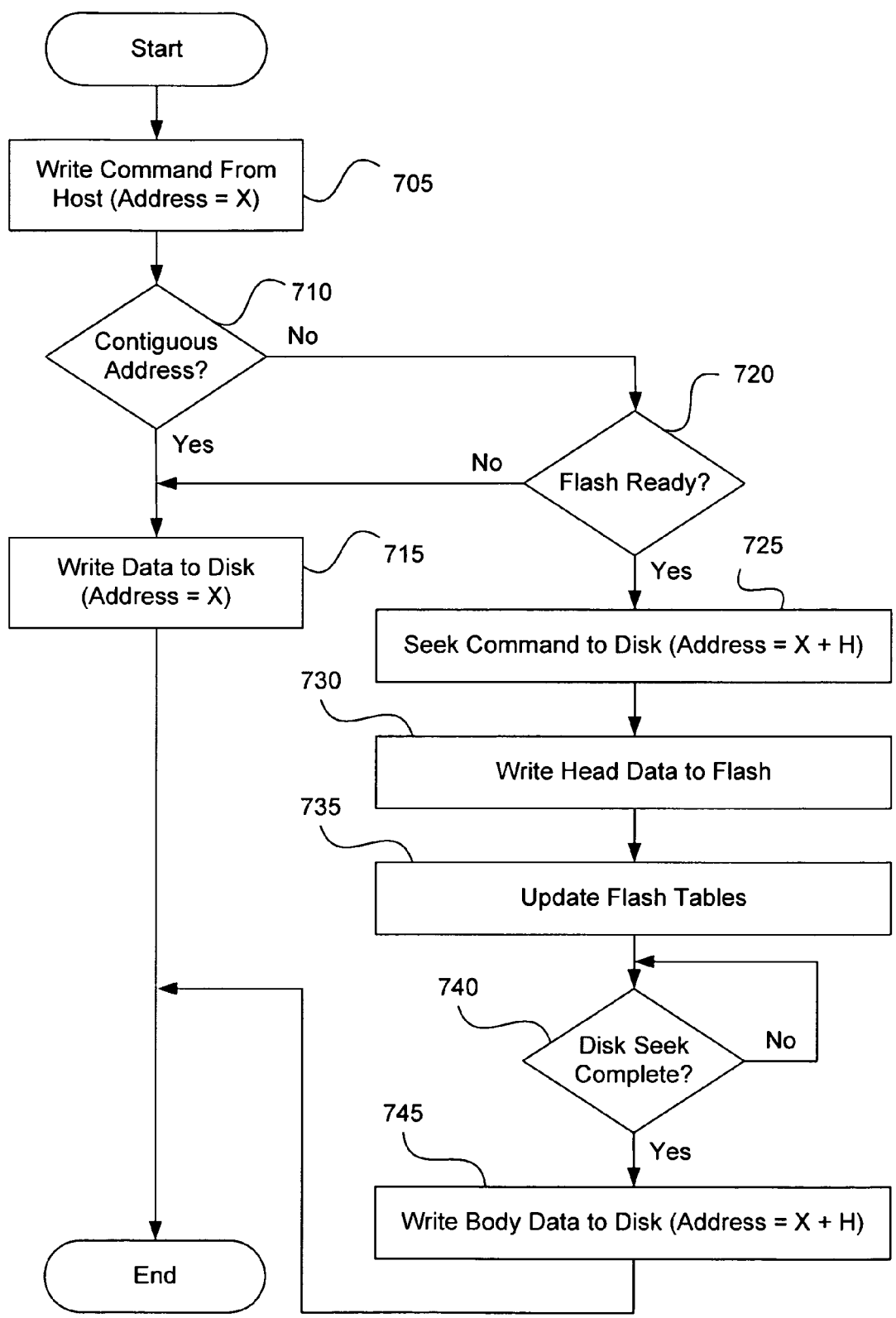
FIG. 7 is a flowchart of an exemplary write technique according to an exemplary embodiment of the present invention.

FIG. 7 is a flowchart of an exemplary write technique according to an exemplary embodiment of the present invention. At 705 a command is received from the host system bus 155 to write data at some address X. At 710 the improved mass storage device 150 determines whether address X is contiguous with the previously accessed address, and therefore is part of an existing data fragment, or is non-contiguous with the previous address and defines the start of a new data fragment. If the address is contiguous, the data is written directly to hard drive 210 at 715, in continuation of the existing data fragment. If the address is non-contiguous, an attempt is made to write the data to flash memory array 215 as the head data for the new data fragment.

If head data is to be written, then the system determines whether the flash memory array 215 is ready at 720. If the flash memory array 215 is not available for any reason, then the system can simply write to the hard drive 210 at 715, and not implement acceleration for this fragment. If the flash memory array 215 is available then the next three operations can all occur at approximately the same time.

The first of the three operations is to send a seek command to the hard drive 210 at 725. The seek command should take into account an offset that is equivalent to the size of the head data if data is eventually going to be transferred to the hard drive 210 from the flash memory array 215. The hard drive 210, therefore, should receive a seek command to position the read/write head to address X+H, where H is the size of the head data offset. At 730 the head data is written to the flash memory array 215. If a ring buffer is used, then the head data is written at the write pointer. At 735 the block mapping tables are updated to indicate that head data is exclusively stored in the flash memory array 215. In order to properly coordinate data, the storage controller 245 should have information relating to the logical address in the magnetic hard disk 225 and the physical address in the flash memory array 215. Additionally, other information might also be stored in the block mapping tables. For example, if the head size is variable, then the size of the head should also be stored. Other flags are discussed in connection with FIG. 8 below.

While the head data is being written to the flash memory array 215 and the block mapping tables are updated, the hard drive 210 waits for the magnetic hard disk 225 to be properly positioned at 740. Once in position, the body data can begin to be written to the magnetic hard disk 225 at 745, assuming the improved mass storage device 150 has received the body data from the host system bus 155.

The present invention is not only useful for writing data to a data storage device, but is also suitable for reading data from a data storage device.

Figure 8:
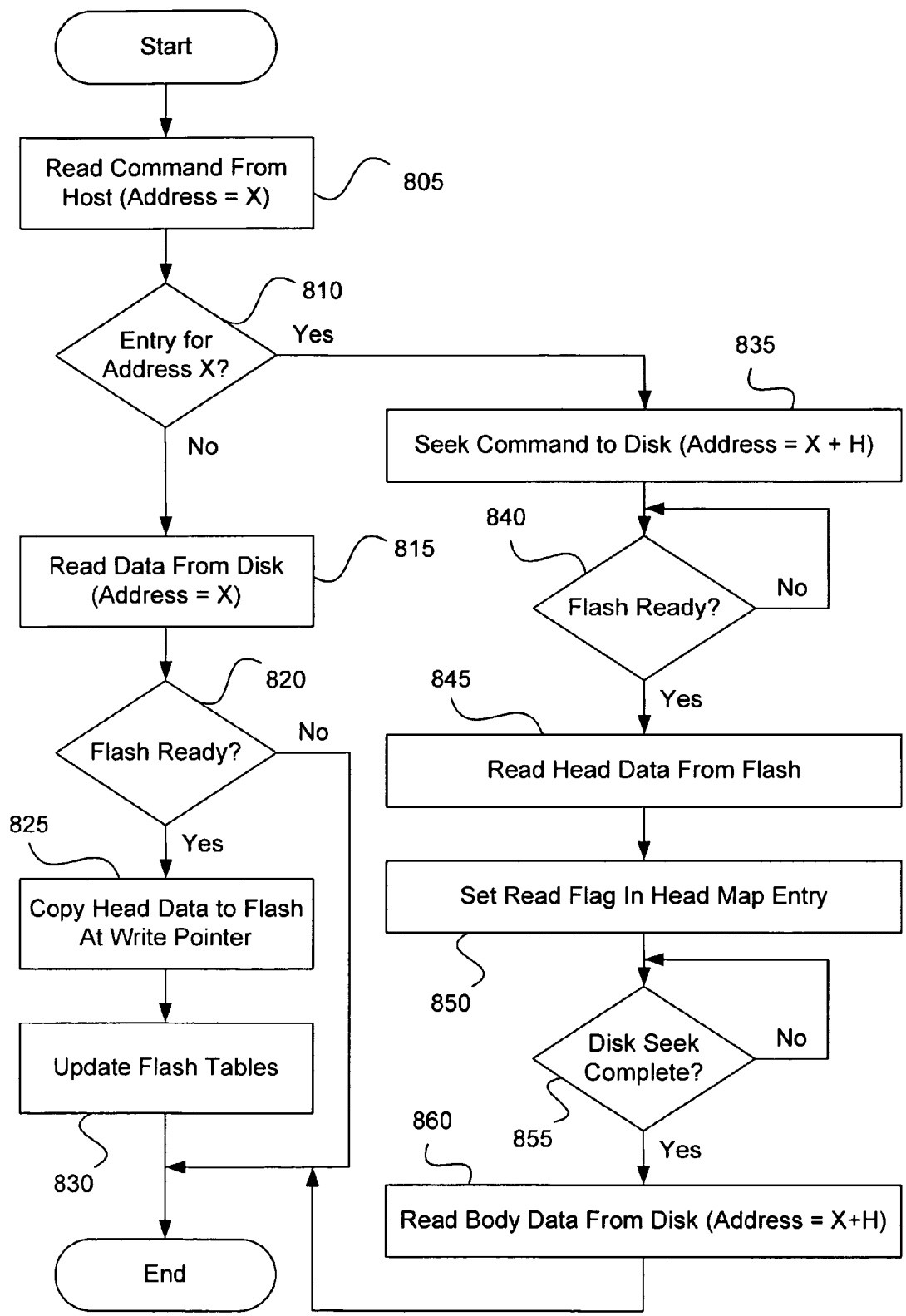
FIG. 8 is a flowchart of an exemplary read technique according to an exemplary embodiment of the present invention.

FIG. 8 is a flowchart of an exemplary read technique according to an exemplary embodiment of the present invention. At 805 a command is received from the host system bus 155 to read data at some address X. At 810 the storage controller 245 determines whether an entry for address X exists in the block mapping table. If the address is not in the block mapping table, then the system reads the data from the hard drive 210 at 815. Then, at 820, the system determines whether the flash memory array 215 is ready for writing. If the flash memory array 215 is not available for some reason (e.g., garbage collection) then the process can simply end, acting as a system without disk acceleration. However, if the flash memory array 215 is available, then, while the data is being read from the hard drive 210, the head data can be copied to the flash memory array 215 at 825. Then, at 830, the block mapping tables can be updated to indicate that the head data now resides on the flash memory array 215.

Once an entry exists in the block mapping tables, then the storage controller 245 would follow a different path after a read command is received at 805. If the address is in the block mapping tables at 810, then the storage controller 245 would send a seek command to the hard drive 210 for the address of the body data in the hard drive 210. In the present embodiments, the address of the body data would be the address X offset by the size of the head data. At 840 the storage controller 245 would then typically wait for the flash memory array 215 to be ready. Certain embodiments, however, could have additional error handling routines that determine whether a copy of the head also exists in the hard drive 210 and, if appropriate, simply read the data from the hard drive 210 if it becomes available before the flash memory array 215. In certain embodiments that use the read technique exclusively, a copy of the head data would always exist in the hard drive. Once the flash memory array 215 is available, then the head data is read from the flash at 845. At 850 a flag in the block mapping tables can be set to indicate that the data corresponding to the table entry has been read. If a ring buffer arrangement were used, such a flag would allow the entry to be retained in the ring buffer by copying to the top of the buffer rather than to the hard drive, when the metablock containing it has to be erased.

After the head data was completely read out of the flash memory array 215, then the system might need to wait for the magnetic hard disk 225 to be positioned correctly at 855. Once properly positioned, the body data is read from the magnetic hard disk 225 at 860.

Although the invention has been described in its presently contemplated best mode, it is clear that it is susceptible to numerous modifications, modes of operation and embodiments, all within the ability and skill of those familiar with the art and without exercise of further inventive activity. For example, other improved storage devices might use technology other than either flash or hard drives, and might include battery backed RAM, optical disks, ovonics unified memory (OUM), magnetic RAM (MRAM), ferroelectric polymer, ferroelectric RAM (FeRAM), silicon on insulator (SoI), etc. Accordingly, that which is intended to be protected by Letters Patent is set forth in the claims and includes all variations and modifications that fall within the spirit and scope of the claims.

What is claimed is:

1. A method of improving the performance of reading data from a rotating disk drive, comprising:

receiving a first command from a host system to read a burst of data with a defined starting address in the rotating disk drive;

determining if the address for the burst of data for the first command is non-contiguous to a previously accessed address;

if it has been determined that the address is non-contiguous, then reading the requested data from the rotating disk drive and copying an initial portion of the data to a non-volatile memory device;

subsequently receiving a second command from the host system to read a burst of data with the same starting address in the rotating disk drive;

determining if the address for the burst of data from the second command is non- contiguous to a previously accessed address;

if it has been determined that the address is non-contiguous, then reading the initial portion of the requested data from the non-volatile memory device, and reading the remainder of the requested data from the rotating disk drive, thereby eliminating delay in providing data to the host system caused by seek time in the rotating disk drive.

2. The method of claim 1, wherein the rotating disk drive and the non-volatile device are part of a computer system, and wherein the non-volatile memory device is removable from the computer system.

3. The method of claim 1, wherein the non-volatile memory device is a solid-state memory.

4. The method of claim 3, wherein the solid-state memory is flash memory, and wherein the rotating disk drive is a magnetic hard disk drive.

5. A method of improving the performance of reading data from a hard drive provided in a computer system, comprising:

receiving a request from a host system to read data with a defined starting address in the hard drive;

determining if the address of requested data is contiguous to a previously accessed data;

if the address of the requested data is contiguous to the previously accessed data, then reading the requested data from the hard drive; and if the address of the requested data is not contiguous to the previously accessed data, then determining whether a first portion of the requested data resides on a non-volatile mass storage device;

if the first portion of the requested data resides on the non-volatile mass storage device, then reading the first portion of the requested data from the non-volatile mass storage device and reading the remainder of the requested data from the hard drive; and if the first portion of the requested data does not reside on the non-volatile mass storage device, then reading the requested data from the hard drive and copying the first portion of the requested data to the non-volatile mass storage device.

6. A data storage system comprising:

a first non-volatile storage device;

a second non-volatile storage device having a slower average access time and a higher capacity than the first storage device, wherein the slower average access time is the average delay that is necessary before the second non-volatile storage device can begin to read data; and a storage controller operable to retrieve a first portion of data from the first storage device and a second portion of data from the second storage device, to receive a first command from a host system to read a data fragment with a defined starting address in the second storage device;

to determine if the address for the data fragment for the first command is non-contiguous to a previously accessed address; and if it has been determined that the address is non-contiguous, then to read the requested data from the second storage device and to copy an initial portion of the data to the first storage device.

7. The data storage system of claim 6, wherein the storage controller is further operable to:

subsequently receive a second command from the host system to read a data fragment with the same starting address in the second storage device;

determine if the address for the data fragment from the second command is non-contiguous to a previously accessed address;

if it has been determined that the address is non-contiguous, then read the initial portion of the requested data from the first storage device, and to read the remainder of the requested data from the second storage device.

8. The data storage system of claim 7, wherein the first storage device is solid-state memory, and the second storage device is a hard drive, and wherein, if it has been determined that the address is non-contiguous, then the reading of the initial portion of the requested data from the first storage device serves to reduce delay in providing data to the host system that would otherwise be caused by a seek delay of the hard drive in transitioning to the address that is non-contiguous.

9. A method for storing data comprising:

receiving a write command from a host system bus to write to a data address;

receiving a data fragment from the host system bus; storing a first portion of the data fragment in a first storage device; causing, prior to the completion of storing the first portion of the data fragment in the first storage device, a second storage device to be prepared to write data; and storing a remaining portion of the data fragment in the second storage device after the second storage device has been prepared;

updating a head table that contains information relating to the location of the first portion of data and the remaining portion of data; and subsequently copying the first portion of the data fragment from the first storage device to the data address in the second storage device.

10. The method for storing data of claim 9, further comprising updating a head table that contains information relating to the location of the first portion of data and the remaining portion of data.

11. The method for storing data of claim 9, wherein the copying is performed during when the host system bus is not requesting access to the data contained in either the first or second storage device.

12. The method for storing data of claim 9, wherein the entire data fragment is stored exclusively in the second storage device if the first storage device is not available.

13. A method for retrieving data comprising:

receiving a read command from a host system bus to read data at a data address;

determining if a first portion of the data resides on a first storage device;

if the first portion of data resides on the first storage device, then reading the first portion of the data from the first storage device;
   causing, prior to the completion of reading the first portion of the data fragment in the first storage device, a second storage device to be prepared to read a remaining portion of the data; and
   reading the remaining portion of data from the second storage device after the second storage device has been prepared to read the remaining portion of the data; and
if the first portion of data does not reside on the first storage device, then reading both the first portion of the data and the remaining portion of the data from the second storage device.

14. The method for retrieving data of claim 13, wherein both the first portion of data and the remaining portion of data are read from the second storage device if the first storage device is not available.

15. A computer-readable medium including at least computer program code for retrieving data, the computer-readable medium comprising:

computer program code for receiving a read command from a host system bus to read data at a data address;
computer program code for determining if a first portion of the data resides on a first storage device;
computer program code for, if the first portion of data resides on the first storage device, then
   reading the first portion of the data from the first storage device;
   causing, prior to the completion of reading the first portion of the data fragment in
the first storage device, a second storage device to be prepared to read a remaining portion of the data; and
   reading the remaining portion of data from the second storage device after the second storage device has been prepared to read the remaining portion of the data; and
computer program code for, if the first portion of data does not reside on the first storage device, then reading both the first portion of the data and the remaining portion of the data from the second storage device.

* * * * *